(12) United States Patent
Aus der Fuenten et al.

(10) Patent No.: US 10,420,438 B2
(45) Date of Patent: Sep. 24, 2019

(54) PORTION PACK FOR PREPARING BEVERAGES

(71) Applicant: MELITTA SINGLE PORTIONS GMBH & CO. KG, Minden (DE)

(72) Inventors: Sandra Aus der Fuenten, Bielefeld (DE); Jan Pahnke, Minden (DE)

(73) Assignee: MELITTA SINGLE PORTIONS GMBH & CO. KG, Minden (DE)

( * ) Notice: Subject to any disclaimer, the term of this patent is extended or adjusted under 35 U.S.C. 154(b) by 147 days.

(21) Appl. No.: 15/575,342

(22) PCT Filed: Mar. 7, 2016

(86) PCT No.: PCT/EP2016/054788
§ 371 (c)(1),
(2) Date: Nov. 17, 2017

(87) PCT Pub. No.: WO2016/184584
PCT Pub. Date: Nov. 24, 2016

(65) Prior Publication Data
US 2018/0153336 A1    Jun. 7, 2018

(30) Foreign Application Priority Data

May 19, 2015  (DE) .................. 10 2015 107 817

(51) Int. Cl.
*A47J 31/44*      (2006.01)
*A47J 31/06*      (2006.01)
(Continued)

(52) U.S. Cl.
CPC ....... *A47J 31/4492* (2013.01); *A47J 31/0689* (2013.01); *A47J 31/407* (2013.01);
(Continued)

(58) Field of Classification Search
CPC .............. B65D 85/8043; A47J 31/4492; A47J 31/0689; A47J 31/44; A47J 31/407
See application file for complete search history.

(56) References Cited

U.S. PATENT DOCUMENTS 8,734,874 B1    5/2014  Paolone
2011/0274802 A1  11/2011  Rivera
(Continued)

FOREIGN PATENT DOCUMENTS

DE    10 2006 004 329 A1    8/2007
DE    10 2007 028 674 A1    8/2008
(Continued)

OTHER PUBLICATIONS

International Search Report for PCT/EP2016/054788, dated Jun. 3, 2016, and English Translation thereof.
(Continued)

*Primary Examiner* — Viren A Thakur
*Assistant Examiner* — Chaim A Smith
(74) *Attorney, Agent, or Firm* — Fisherbroyles, LLP; Robert Kinberg

(57) ABSTRACT

A portion pack for preparing beverages, in particular tea or coffee, comprises a container for holding a substance suitable for beverage preparation and an adapter which can be inserted into a machine for beverage preparation. The container is liquid-permeable at least in some regions or can be perforated during the beverage preparation. The container is releasably fastened to the adapter. The adapter can be reused to prepare a plurality of beverages.

12 Claims, 5 Drawing Sheets

(51) Int. Cl.
*B65D 85/804* (2006.01)
*A47J 31/40* (2006.01)
(52) U.S. Cl.
CPC .......... *A47J 31/44* (2013.01); *B65D 85/8043* (2013.01); *Y02W 90/13* (2015.05)

(56) References Cited

U.S. PATENT DOCUMENTS

2015/0104550 A1  4/2015  Oh
2015/0158665 A1  6/2015  Krueger et al.

FOREIGN PATENT DOCUMENTS

| | | |
|---|---|---|
| DE | 20 2009 009 215 U1 | 10/2009 |
| WO | 2006/137737 A2 | 12/2006 |
| WO | 2009/050540 A1 | 4/2009 |
| WO | 2011/141532 A1 | 11/2011 |
| WO | 2011/141535 A1 | 11/2011 |
| WO | 2012/062842 A1 | 5/2012 |
| WO | 2013/038111 A2 | 3/2013 |
| WO | 2014/001564 A1 | 1/2014 |
| WO | 2014/016208 A1 | 1/2014 |
| WO | 2014/153659 A1 | 10/2014 |

OTHER PUBLICATIONS

Written Opinion for PCT/EP2016/054788, dated Jun. 3, 2016, and English Translation thereof.
German Search Report for DE 10 2015 107 817.1, dated Dec. 18, 2015, and English Translation thereof.

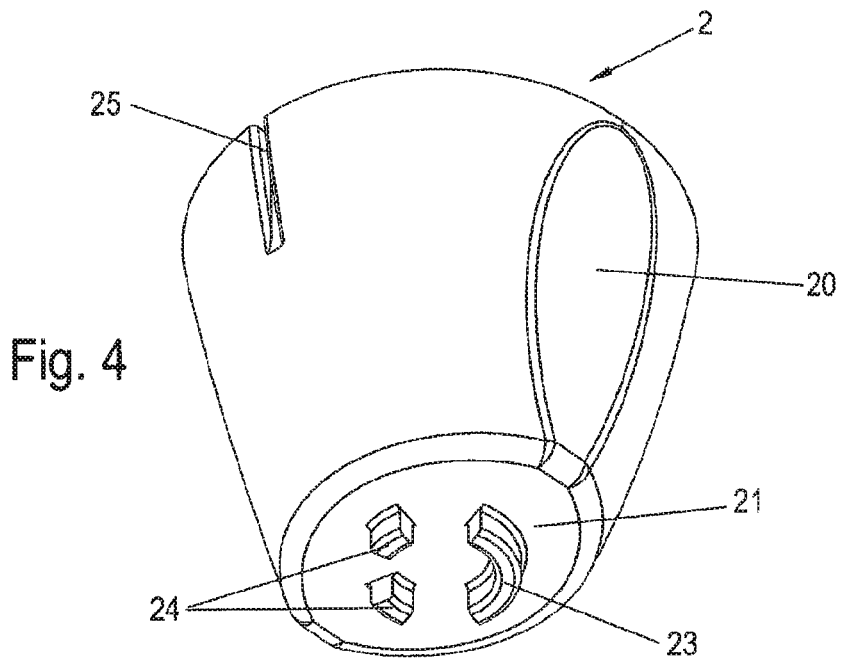
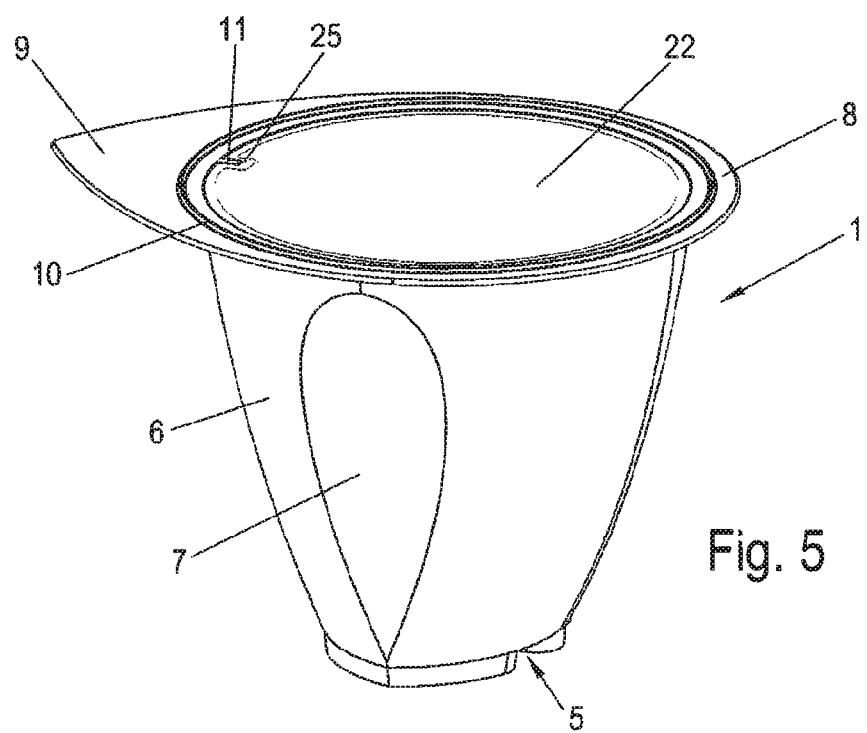

PORTION PACK FOR PREPARING BEVERAGES

CROSS-REFERENCE TO RELATED APPLICATIONS

This application is a U.S. National Stage Application of International Patent Application No. PCT/EP2016/054788, filed Mar. 7, 2016, which claims benefit of German Patent Application No. 10 2015 107 817.1, filed May 19, 2015.

TECHNICAL FIELD

The present invention relates to a portion pack for preparing beverages, in particular tea or coffee, comprising a container in which a substance suitable for beverage preparation is arranged, wherein the container is at least regionally liquid-permeable or can be perforated during the beverage preparation, and an adapter, which is insertable into a machine for beverage preparation.

BACKGROUND OF THE INVENTION

DE 20 2009 009 215 U1 discloses a kit comprising a capsule, which has a cup-shaped main body and a cover element. The cover element can close the capsule, so that an active ingredient for the beverage preparation can be decanted into the capsule. The filling and any possible cleaning of the capsule is comparatively complex, however. Moreover, it cannot be ensured in the case of manual filling that exact metering of the substance is ensured.

DE 10 2007 028 674 discloses a refillable capsule for a machine for beverage preparation, in which opening and closing of the capsule is possible, to fill and remove a substance for beverage preparation. The handling of such a capsule is comparatively complex, and the metered quantity also cannot be set accurately here.

SUMMARY OF THE INVENTION

It is therefore the object of the present invention to provide a portion pack for preparing beverages, in which repeated usability is provided at least for one part and the handling is made simple.

The above and other objects are achieved according to an embodiment of the invention by a portion pack for preparing beverages, in particular tea or coffee, that comprises, a container for holding a substance suitable for beverage preparation, wherein the container is at least regionally liquid-permeable or can be perforated during the beverage preparation, and a repeatedly usable adapter, constructed for insertion into a machine for beverage preparation, wherein the container is constructed to be detachably fixed on the adapter.

According to the invention, the portion pack comprises a container having a substance suitable for beverage preparation and an adapter, which is insertable into a machine for beverage preparation. In this case, the container is detachably fixed on the adapter, so that for the beverage preparation, the unit made of adapter and container can be inserted into the machine for beverage preparation. After the beverage preparation, the container can be removed from the adapter again, so that the adapter can be used for a plurality of beverage preparations. The handling by way of the insertion and removal of the container is comparatively simple in this case, since the user does not have to perform complex metering procedures, but rather merely inserts the container into the adapter. Since the adapter absorbs the mechanical stresses in the device and provides the interfaces to the device, the container can be produced in a cost-optimized manner.

The adapter preferably has a cup-shaped receptacle for the container. The insertion of the container can thus be made simple, since it is inserted into the receptacle and detachably fixed therein, for example, via formfitting means or stops, wherein a clamping or latching fixation is also possible.

In a further embodiment of the invention, at least one coding is provided on the container, by means of which at least one item of information about the substance arranged in the container is identifiable. Such a coding can be used by the machine for beverage preparation to vary certain parameters depending on the substance in the container. In the case of the preparation of tea, for example, the water temperature during the brewing procedure or the steeping time can be varied, while the pressure or the temperature can be varied in the case of the preparation of coffee. Such a coding can be produced mechanically by the shaping, but also by other means, for example, labels, memories, or other elements.

The adapter preferably has a bottom, on which means for light deflection are provided. The means for light deflection can have in this case at least one interruption, into which a coding of the container is insertable. A read device can then radiate a light beam into the bottom of the adapter, which then alternately is incident on the coding or not, so that it influences an emission of the light beam, so that an identification of the container is enabled. The means for light deflection can deflect a light beam entering at the bottom of the adapter at least twice, so that the light beam at least partially exits again at the bottom of the adapter. An identification of the type of the beverage substance in the container can thus be performed in a constricted space. The coding can comprise in this case on the container at least one projection protruding from the bottom of the container, which is positionable in a light beam of the read device.

The adapter preferably consists of a transparent material, in particular of a plastic. The transparency preferably comprises at least the bottom region, in which the optical detection by the read device is performed.

The container preferably consists of a biologically decomposable material, for example, a biologically decomposable plastic, wherein cellulose can also be used. During the beverage preparation, the container can then be disposed of as a unit after a brewing procedure, which does not have a disadvantageous effect on the environmental balance because of the biologically decomposable design. In contrast, the adapter is repeatedly reused and can consist of a non-biologically decomposable material.

In a further embodiment, the container is closed on at least one side via a net. The container is thus made liquid-permeable at least on one side and can be filled for a brewing procedure, for example, using hot water in the case of the preparation of tea. The net can be outwardly open in this case and is not covered by the adapter, so that simple handling is ensured after the insertion of the container. To align the container to the adapter, corresponding means for alignment can be provided, so that a fixation of the container in only a single predetermined position on the adapter is enabled. It is thus ensured that a coding on the container can be detected correctly when it is fixed on the adapter.

BRIEF DESCRIPTION OF THE DRAWINGS

The invention will be explained in greater detail hereafter on the basis of an exemplary embodiment with reference to the appended drawings. In the figures:

FIG. 4 shows a perspective view of the container of the portion pack of FIG. 1;

FIG. 5 shows a perspective view of the portion pack of FIG. 1 having inserted container;

DETAILED DESCRIPTION OF THE INVENTION

Figure 1:
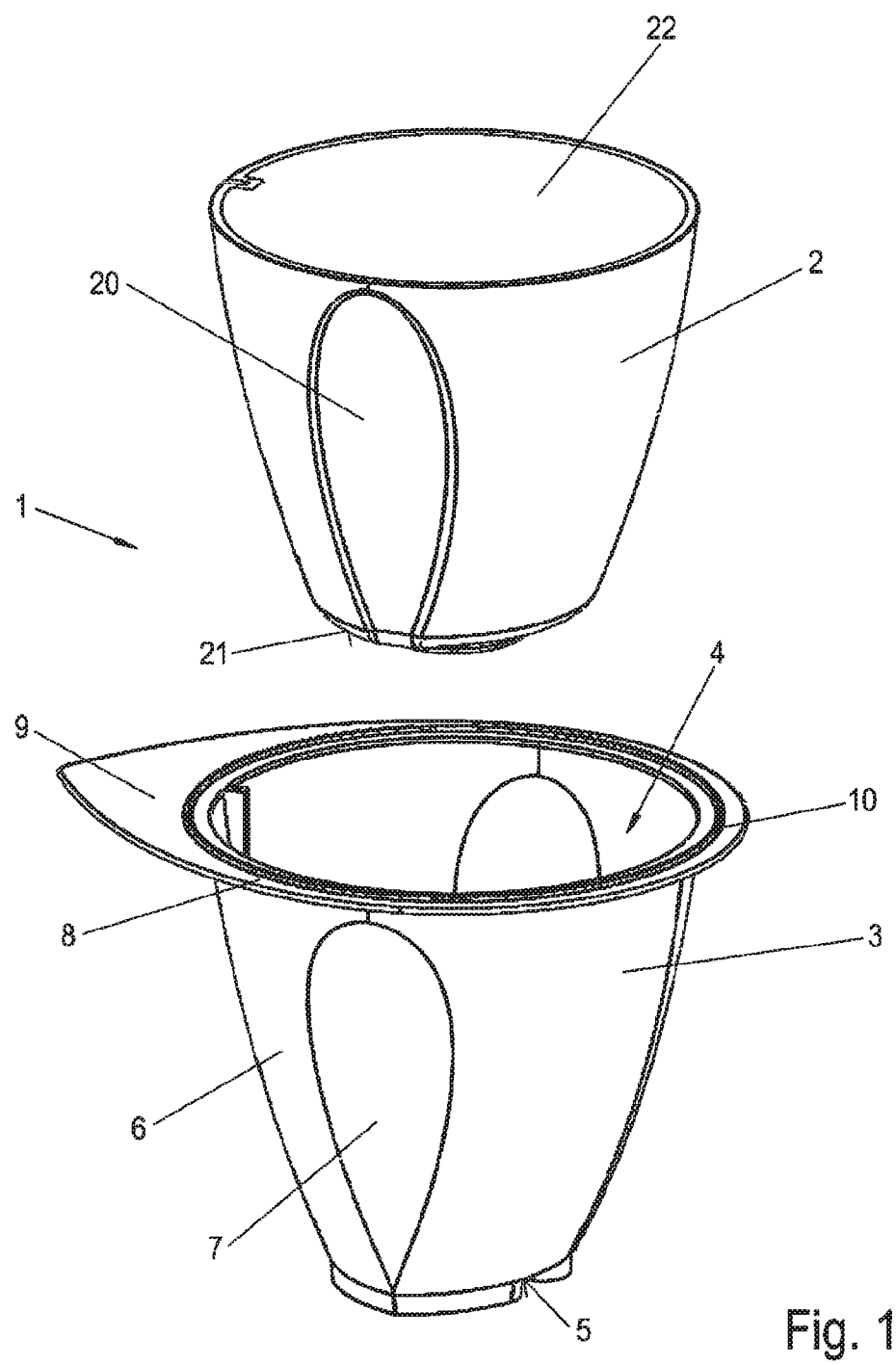
FIG. 1 shows a perspective exploded illustration of a portion pack according to the invention for preparing beverages.

A portion pack 1 comprises a closed container 2, in which a substance suitable for beverage preparation, for example, coffee grounds or tea, is arranged. The container 2 is detachably fixed in a cup-shaped adapter 3, wherein the container 2 can be inserted into an inner chamber 4 of the adapter 3.

The adapter 3 comprises a bottom 5 and side walls 6, wherein at least one flattening 7 is provided on the side walls 6. On the side opposite to the bottom 5, a circumferential edge 8 is provided, which protrudes radially outward and forms a protruding grip section 9 in one region. A ring-shaped seal 10 protruding toward the upper side is formed on the circumferential edge 8, which seal enables sealing when the adapter 3 is inserted with the container 2 into a brewing chamber of a machine for beverage preparation. It is also possible to provide a seal on the brewing chamber, so that the edge 8 only forms a stop or a support for the seal.

The container 2 has a contour which is substantially adapted to the inner chamber 4 of the adapter 3, so that the container 2 can be inserted in a substantially formfitting manner into the adapter 3. The container 2 comprises a bottom 21, which can be placed on the bottom 5 of the adapter 3. Furthermore, side walls are provided on the container 2, which have a flattening 20, and the flattening 20 can be positioned adjacent to the flattening 7 on the adapter 3. A net 22 is provided on an upper side of the container 2, which is liquid-permeable, to enable an inflow of hot water into the container 2 for the beverage preparation. It is also possible to provide a liquid-tight cover instead of the net 22, which is then perforated during the beverage preparation. Moreover, the cover or the net can also be detachably fixed on the container 2.

Figure 2:
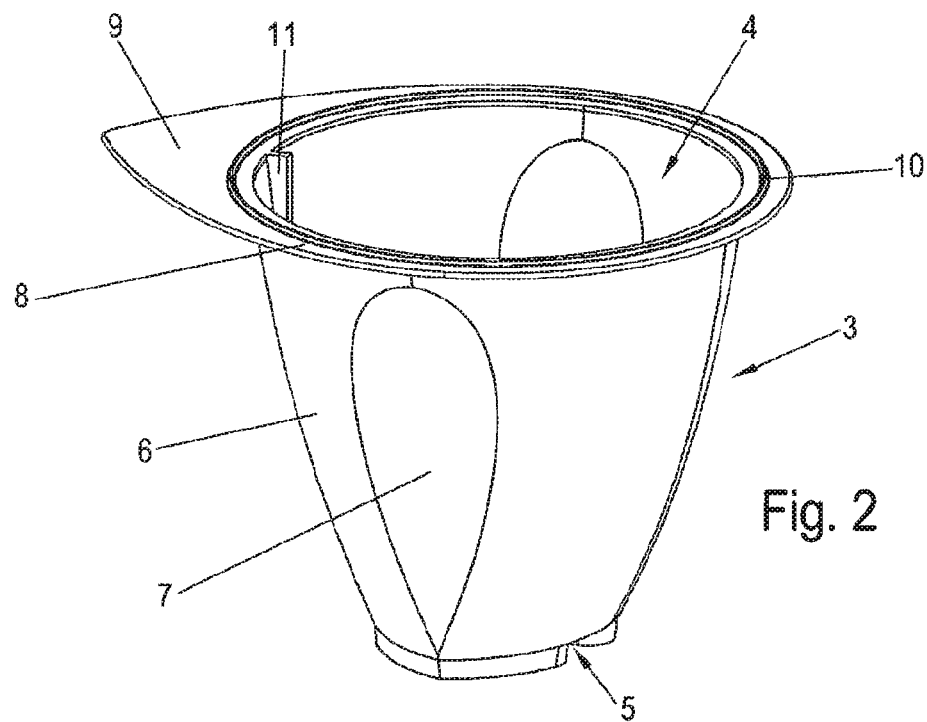
FIG. 2 shows a perspective view of the adapter of the portion pack of FIG. 1.

To be able to position the container 2 in only a single position on the adapter 3, corresponding positioning means are formed. As can be seen in FIG. 2, a strip 11 protrudes into the inner chamber 4 of adapter 3 adjacent to the grip section 9. This strip 11 interacts with a grooved recess 25, which is formed on a side wall of the container 2, as shown in FIG. 4. Of course, it is also possible to provide other positioning means, for example, a strip instead of a recess 25 can be provided on the container 2, or the shape of the positioning means can be altered. In any case, the positioning means ensure that the container 2 can only be inserted in a single position into the inner chamber 4 so that the upper edge 8 of the adapter 3 is arranged substantially surface flush with the net 22.

The container 2 also comprises a coding on the bottom 21, which is formed by one curved strip-shaped projection 23 and two shorter projections 24. The projections 23 and 24 protrude from a flat bottom surface and can provide an item of information about the substance arranged in the container 2. The projections containing the coding may at least partially absorb light for this purpose. The projections 23 and 24 can be varied in the length and shape depending on the substance.

Figure 3:
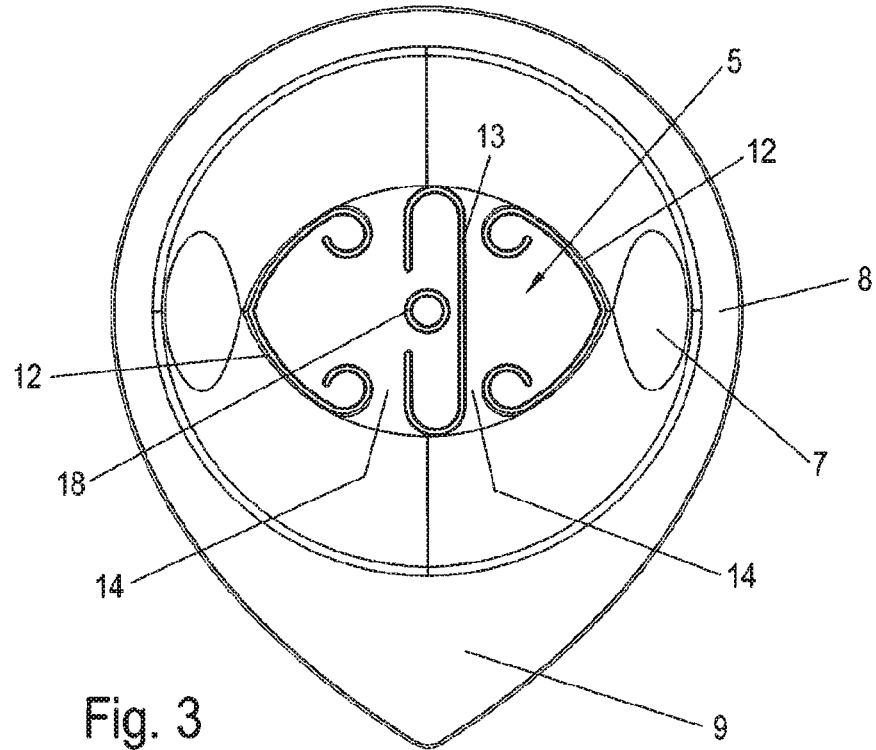
FIG. 3 shows a bottom view of the adapter of FIG. 2.

The lower side of the adapter 3 is shown in FIG. 3. A flat bottom surface is provided on the bottom 5 on the adapter 3, from which web-shaped guide means 12 and 13 protrude. These guide means 12 and 13 can interact with guide means on a machine for beverage preparation, in particular to guide the portion pack along a shaft, so that it is then correctly positioned adjacent to a brewing chamber. Moreover, a decoupling surface 18 is provided in the center, which interacts with a read device of the machine for beverage preparation to carry out a recognition of which type of a beverage substance is arranged in the container 2. The guide means 12 and 13 are arranged in this case on an outer side of the bottom 5, while elements for the recognition of the container type are provided on the inner side of the bottom 5. A gap 14, which specifies the falling direction of the portion pack 1 in a shaft, is provided on the outer guide means between the V-shaped guide means 12 and a middle guide means 13.

The portion pack having inserted container 2 is shown in FIG. 5. The strip 11 engages in the recess 25 of the container 2. The upper side of the container 2, which has the net 22, is aligned surface-flush with the edge of the adapter. In this form, the portion pack can be inserted into a machine for beverage preparation.

Figure 6:
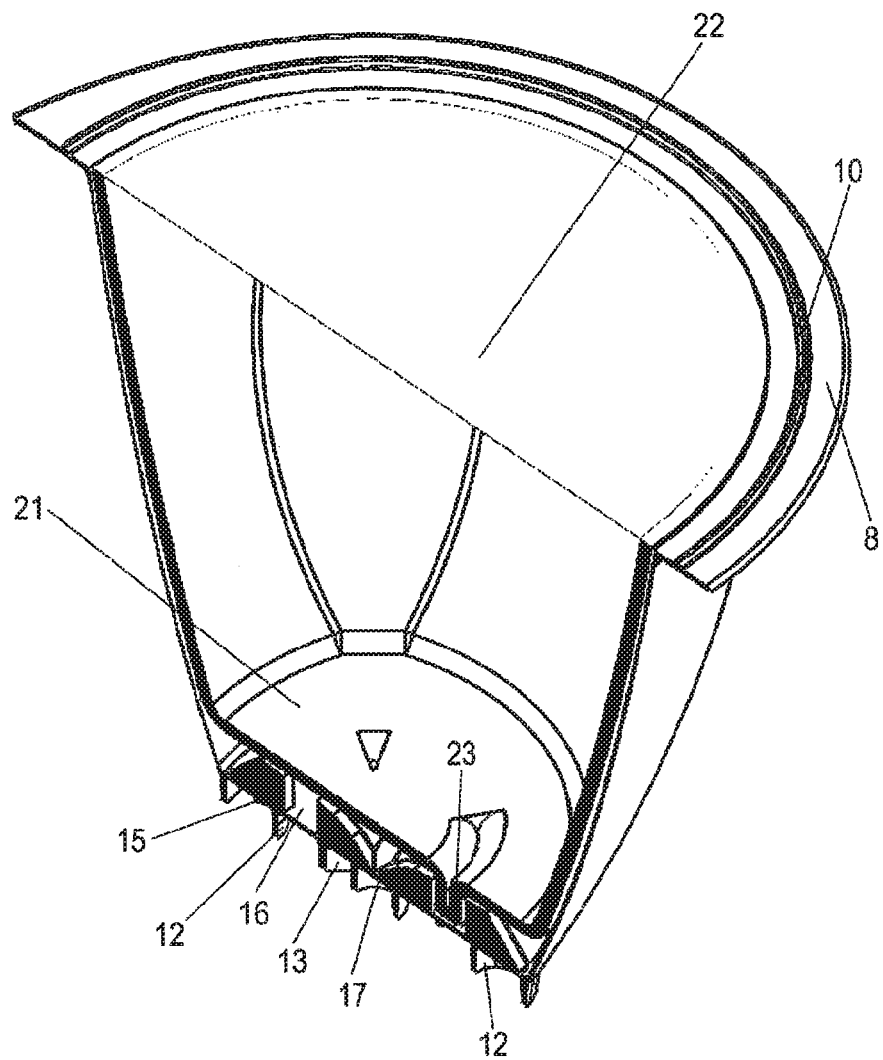
FIG. 6 shows a sectional view of the portion pack of FIG. 5.

FIG. 6 shows a section through a portion pack having inserted container 2. It is recognizable that the bottom 21 of the container 2 does not rest directly on the bottom 5 of the adapter 3, but rather means are provided in between for light deflection. These means for light deflection are formed by blocks 15 and 17, which protrude on the inner side of the adapter 3. An interruption 16 can be provided between the blocks 15 and 17, into which a coding of the container 2 is insertable.

Figure 7:
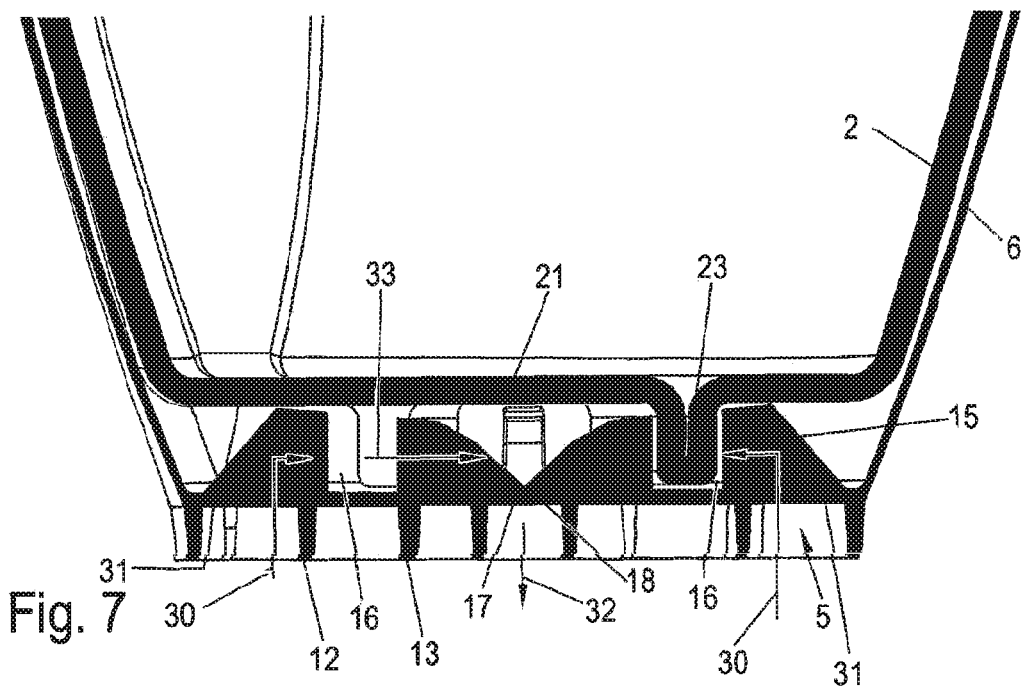
FIG. 7 shows a sectional detail view of the bottom region of the portion pack.

In the enlarged view of FIG. 7, it is recognizable that to detect the container type, firstly light is radiated into the coupling surfaces 31, as schematically shown by the arrows 30. Behind the coupling surfaces 31, blocks 15 are provided, which deflect the entering light beam in the direction of the container center. The light beam extends after the deflection in a region of the light guiding according to the arrow 33 substantially parallel to the bottom 5. From the outer blocks 15, the light beams can arrive at the inner blocks 17, which are also designed for light deflection and enable the light beam to be deflected again by the blocks 17 such that it exits outward again at the decoupling surface 18 through the bottom 5, as schematically shown by the arrow 32. The means for light deflection can therefore deflect a light beam entering into the bottom essentially by 180°, so that a light sensor can be provided adjacent to a light source, by means of which it is detectable whether the respective light beam exits at an exit surface or not.

In FIG. 7, no coding of the container 2 is inserted on the left side at an interruption 16, so that a light beam can be deflected from the block 15 to the block 17, which then again emits the light beam toward the bottom 5 and a sensor arranged adjacent can detect that no interruption of the light beam was performed here. On the right side in FIG. 7, in contrast, the projection 23 is arranged in the interruption 16, so that an entering light beam from the block 15 is blocked by the projection 23. The light beam thus no longer reaches the block 17 adjacent to the projection 23 and a sensor adjacent to this block 15 can then no longer detect an exiting light beam. In this manner, it is possible to store items of information about the substance arranged in the container 2.

Figure 8:
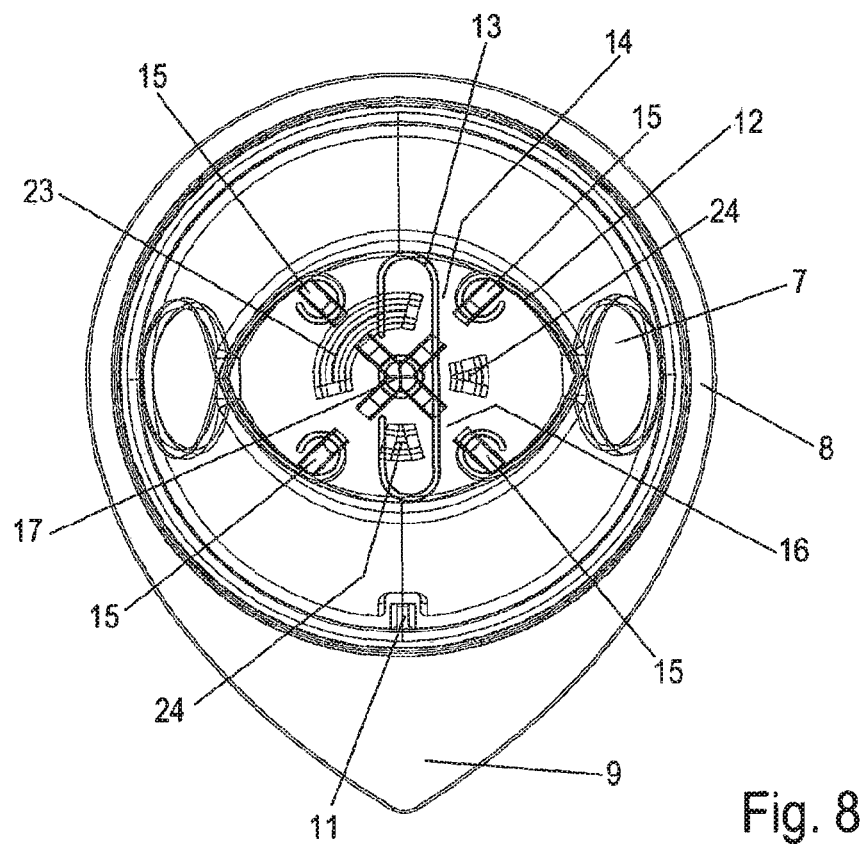
FIG. 8 shows a bottom view of the portion pack having optical detection means.

As shown in FIG. 8, in the illustrated exemplary embodiment, four blocks 15 are provided, which can each deflect a coupled-in light beam to the container center, if no coding in the form of the projections 23 or 24 blocks the path of the light beam. Subsequently, the blocks 17 can deflect the light beam again and decouple it out of the container. In the illustrated exemplary embodiment, the shorter projections 24 are used to ensure a stability of the container 2 and to align it only inside the adapter 3. The longer curved projection 23, in contrast, is arranged in the path of a light beam between the adjacent outer block 15 and the radial center block 17, so that a light beam is interrupted. For this reason, four recognition means are provided on the bottom 5 of the adapter 3 and the container 2, so that a total of 16 different container types can be identified. The number of the recognition means can be varied, however, for example, two or three recognition means or more than four recognition means can also be provided on the bottom.

In the illustrated exemplary embodiment, the adapter 3 consists of a transparent plastic material, which is well suitable for light guiding and deflection. The adapter 3 can be repeatedly used in this case and the container 2 is only inserted into the adapter 3 for the beverage preparation. Subsequently, the container 2 can be disposed of as a unit, so that the user does not have to perform any complex metering or cleaning procedures. The container 2 preferably consists of biologically decomposable material, in particular plastic, paper, or other materials.

The invention claimed is:

1. A portion pack for preparing beverages, comprising,
a container for holding a substance suitable for beverage preparation, wherein the container is at least regionally liquid-permeable or can be perforated during the beverage preparation, and a repeatedly usable adapter, constructed for insertion into a machine for beverage preparation, wherein the container is constructed to be detachably fixed on the adapter wherein the adapter includes a bottom and light deflectors arranged on the bottom, and
wherein the light deflectors have at least one interruption and the container has a bottom and a coding on the bottom which is insertable into the at least one interruption of the deflectors on the bottom of the adapter.

2. The portion pack according to claim 1, wherein the adapter includes a cup-shaped receptacle for the container.

3. The portion pack according to claim 1, wherein the container includes at least one coding by which at least one item of information about the substance arranged in the container is identifiable.

4. The portion pack according to claim 1, wherein the container comprises a biologically decomposable material.

5. The portion pack according to claim 1, wherein the light deflectors deflect a light beam entering at the bottom of the adapter at least two times and the light beam at least partially exits again at the bottom of the adapter.

6. The portion pack according to claim 1, wherein the coding on the container comprises at least one projection protruding from the bottom of the container, which is positionable in a light beam of a read device.

7. The portion pack according to claim 1, wherein the adapter is produced from a transparent material.

8. The portion pack according to claim 1, wherein the container includes a net and is closed at least on one side via the net.

9. The portion pack according to claim 8, wherein the container is positionable in the adapter so that the net is open outwardly and is not covered by the adapter.

10. The portion pack according to claim 1, wherein the adapter and the container include an alignment mechanism for aligning the container on the adapter so that fixing of the container is enabled only in a single predetermined position on the adapter.

11. The portion pack according to claim 1, wherein the adapter has a circumferential edge, which is arranged to be applied to a seal or a stop on a brewing chamber of the machine for beverage preparation.

12. A method of using the portion pack according to claim 1 in the machine for beverage preparation, including:
radiating light on at least one coupling surface on the bottom of the adapter; and
radiating the light out again at least partially on a decoupling surface on the bottom of the adapter, wherein the at least one coding on the container at least partially absorbs light.

* * * * *